Dec. 20, 1938.　　　　M. KLAVÍK　　　　2,140,876

ARRANGEMENT AND MOUNTING OF THE AXLE GEAR IN MOTOR VEHICLES

Filed July 24, 1937

INVENTOR
M. Klavik.

By Lacey & Lacey, Attys

Patented Dec. 20, 1938

2,140,876

UNITED STATES PATENT OFFICE 2,140,876

ARRANGEMENT AND MOUNTING OF THE AXLE GEAR IN MOTOR VEHICLES

Miloš Klavík, Koprivnice, Moravia, Czechoslovakia

Application July 24, 1937, Serial No. 155,531
In Czechoslovakia March 26, 1936

4 Claims. (Cl. 180—73)

In motor vehicles having a central supporting member to which the front and back wheels are attached so as to be movable up and down independently of each other, more particularly with swinging half axles, it is very difficult to insulate the driving parts, that is to say the engine, change speed gear and axle gear both from one another and also from the central supporting member with regard to the transmission of noise and also with regard to the production of vibrations in the vehicle body.

According to the invention, a crank or fork is employed for mounting the axle gear. An upwardly cranked arm extends over the axle gear and is supported on its upper side, preferably with the interposition of a rubber cushion.

The crank or fork and preferably an upwardly directed arm may simultaneously serve for the attachment of the wheel spring, preferably in the form of a transverse spring.

A further feature of the invention is that at least one of the arms of the fork, and preferably the lower arm, is widened horizontally or is divided into two arms and supports the axle gear casing over a certain length or at two points remote from one another, again preferably with the interposition of rubber cushions, so as to absorb the horizontal thrusts and torques set up by the resistances while travelling. Furthermore, the crank or fork also absorbs the brake reactions.

Since the connection between the axle gear casing and the crank or fork is yielding and hence also permits a small angular movement of the axle gear casing about an axis at right angles to the track, the wheel axles of a pair of wheels are preferably set at a small angle to one another in a horizontal plane, so that the planes defined by the two wheels converge forwardly, as has already been done in the case of front wheels.

A constructional example of the invention is shown semi-diagrammatically in the accompanying drawing, wherein.

Figure 1:
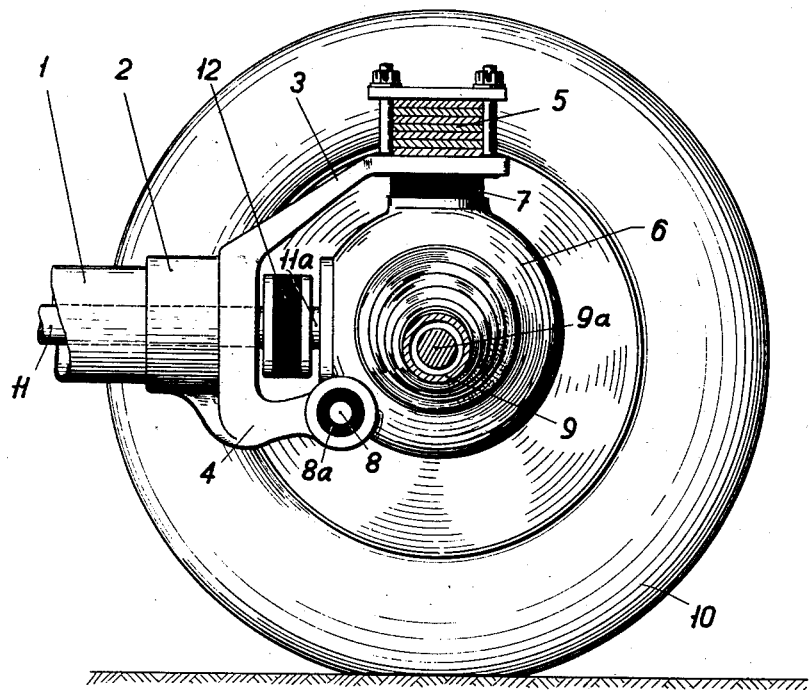
Figure 1 shows the rear end of a chassis together with gear case and one driving wheel, the driving wheel nearest the observer having been omitted.

The central chassis supporting tube 1 is connected at the rear end to a sleeve 2 which, in side view, is extended by an upwardly cranked arm 3 and a downwardly cranked arm 4. In its turn, the arm 4 is forked in the horizontal plane to form two arms 4a and 4b. Secured to the upper side of the arm 3 is a transverse spring 5. The arm 3 extends over the axle gear casing 6 and rests on the casing 6 from above with the interposition of a rubber member 7 or the like.

Figure 2:
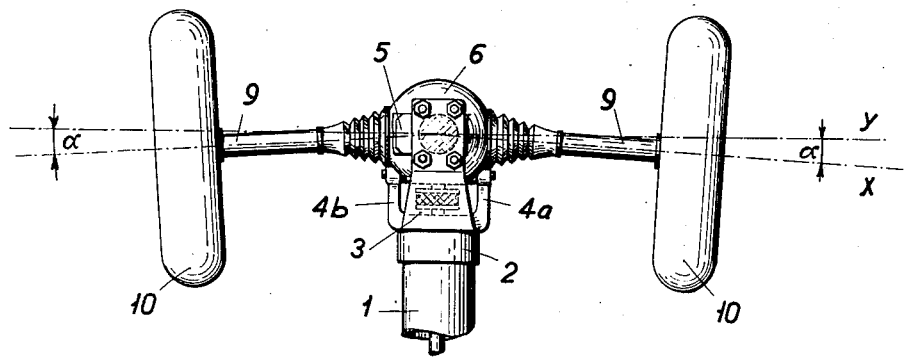
Figure 2 shows the plan pertaining to Figure 1 but on a smaller scale.

The lower arms 4a, 4b are shorter than the upper arm and terminate in front of the vertical central plane of the casing 6. Said arms engage lateral projections or transverse pins 8 of the casing 6, again with the interposition of rubber insertions or the like 8a. The centre lines $x$, $y$ of the half axles pivoted to the casing 6, together with the axle shafts 9a and driving wheels 10 are turned forwardly through the small angle $\alpha$ in the horizontal direction, as will be seen in Figure 2.

Between the sections 11, 11a of the shaft line leading to the axle gear, an intermediate member or coupling 12 for preventing the transmission of noise is likewise inserted in known manner.

Of course, numerous modifications of the construction described and shown are possible. The construction of the cranked arm or of the fork and mounting of the axle gear may be modified in various ways, according to the construction of the axle, axle gear, springing and chassis.

I claim:

1. In a motor vehicle having independently sprung driving wheels and a central longitudinal chassis member, a cranked extension of said chassis member secured to the axle gear casing with the interposition of yielding and shock and noise absorbing means, said yielding connection being adapted to absorb the horizontal forces produced by the resistance to travel and also the braking forces.

2. In a motor vehicle having independently sprung driving wheels, a fork-shaped member fixed to the chassis and having an upper arm and two lower arms spaced apart horizontally, all of said arms being secured to the axle gear casing with the interposition of yielding and shock and noise absorbing means.

3. In a motor vehicle having independently sprung driving wheels, a fork-shaped member fixed to the chassis and having an upper arm and two lower arms spaced apart horizontally, said lower arms being connected to the axle gear casing by pin-like projections extending transversely to the direction of travel, with rubber sleeves and bearing eyes surrounding the latter, and said upper arm extending over the axle gear casing and resting upon it from above.

4. In a motor vehicle having independently sprung driving wheels, a fork-shaped member fixed to the chassis and having a relatively long upper arm and two shorter lower arms spaced apart horizontally, said lower arms being connected to the axle gear casing towards the bottom and near the sides thereof, and said upper arm resting upon the axle gear casing from above.

MILOŠ KLAVÍK.